(12) United States Patent
Hamblin

(10) Patent No.: US 11,780,153 B2
(45) Date of Patent: Oct. 10, 2023

(54) WRAPPING

(71) Applicant: SEVEN STAR WRAPS LIMITED, Stourbridge West Midlands (GB)

(72) Inventor: William Hamblin, Stourbridge West Midlands (GB)

(73) Assignee: SEVEN STAR WRAPS LIMITED, Stourbridge West Midlands (GB)

( * ) Notice: Subject to any disclaimer, the term of this patent is extended or adjusted under 35 U.S.C. 154(b) by 908 days.

(21) Appl. No.: 16/342,867

(22) PCT Filed: Sep. 14, 2017

(86) PCT No.: PCT/GB2017/052708
§ 371 (c)(1),
(2) Date: Apr. 17, 2019

(87) PCT Pub. No.: WO2018/073558
PCT Pub. Date: Apr. 26, 2018

(65) Prior Publication Data
US 2019/0240895 A1 Aug. 8, 2019

(30) Foreign Application Priority Data

Oct. 19, 2016 (GB) .................................... 1617665

(51) Int. Cl.
*B29C 63/40* (2006.01)
*B60J 11/00* (2006.01)
(Continued)

(52) U.S. Cl.
CPC .......... *B29C 63/40* (2013.01); *B29C 63/0004* (2013.01); *B60J 11/00* (2013.01);
(Continued)

(58) Field of Classification Search
CPC .. G01K 11/12; B60J 11/00; B60J 11/04; B60J 11/06; B29C 66/91218;
(Continued)

(56) References Cited

U.S. PATENT DOCUMENTS 2,928,791 A 3/1960 Loconti
3,002,385 A * 10/1961 Wahl ...................... G01K 11/06
422/403

(Continued)

FOREIGN PATENT DOCUMENTS

EP 0501628 A2 9/1992
FR 3022434 A1 12/2015
(Continued)

OTHER PUBLICATIONS

European Search Report for Application No. 17771537.2 dated Feb. 25, 2022.

(Continued)

*Primary Examiner* — John L Goff, II
(74) *Attorney, Agent, or Firm* — Curatolo Sidoti & Trillis Co., LPA; Salvatore A. Sidoti; Floyd Trillis, III

(57) ABSTRACT

A method of wrapping an article such as a vehicle, the method comprises applying a wrapping film to a vehicle and locating a thermochromics material in, adjacent or proximate an area requiring post-heating, heating the wrapping film to effect a post-heating operation until the thermochromics material changes colour.

5 Claims, 3 Drawing Sheets

(51) Int. Cl.
  *G01K 11/12* (2021.01)
  *B29C 63/00* (2006.01)
  *B60R 13/00* (2006.01)
  *B29L 31/30* (2006.01)
(52) U.S. Cl.
  CPC .............. *B60R 13/00* (2013.01); *G01K 11/12* (2013.01); *B29L 2031/30* (2013.01)
(58) Field of Classification Search
  CPC .......... B29C 66/7371; B29C 66/73715; B29C 2063/006; B29C 63/40; B29C 63/0004; B29C 63/0047; B29C 63/0052; B29C 63/0056; B29C 63/0065; B29C 63/0073; B29C 63/0078; B29C 63/02; B29C 61/0666; B29C 61/0683; B29C 65/66; B29L 2031/30; B60R 13/00; B60R 13/04; B32B 38/10
  USPC ........................................................ 156/247
  See application file for complete search history.

(56) References Cited

U.S. PATENT DOCUMENTS

| | | | |
|---|---|---|---|
| 4,105,583 A | | 8/1978 | Glover et al. |
| 4,344,909 A | * | 8/1982 | De Blauwe ............. B29C 61/06 264/230 |
| 5,152,611 A | | 10/1992 | Pieper et al. |
| 5,573,848 A | * | 11/1996 | Van Praet ........... B29C 65/4835 374/E11.018 |
| 6,475,559 B1 | * | 11/2002 | Bettinger ................ B29C 63/40 427/208.2 |
| 2005/0139142 A1 | | 6/2005 | Kelley et al. |
| 2010/0192833 A1 | | 8/2010 | Yang et al. |
| 2017/0213441 A1 | * | 7/2017 | Welin ..................... G01K 11/12 |

FOREIGN PATENT DOCUMENTS

| | | |
|---|---|---|
| KR | 20160028001 A | 3/2016 |
| WO | 9503934 A1 | 2/1995 |
| WO | 2013170273 A1 | 11/2013 |

OTHER PUBLICATIONS

Search Report from the UK Intellectual Property Office for GB1617665. 3, dated Apr. 6, 2017.
International Search Report and Written Opinion for PCT/GB2017/052708 dated Apr. 19, 2018.
Liquid Crystal Thermometers, Telatemp Corporation, Jun. 28, 2012, available at: https://www.telatemp.com/c/211/reversible-labels-liquid-crystal-thermometer-strips.

* cited by examiner

WRAPPING

This application is a national stage application of International Application No. PCT/GB2017/052708, filed 14 Sep. 2017, which claims priority from GB 1617665.3, filed 19 Oct. 2016, which applications are incorporated herein by reference.

This invention relates to wrapping, and particularly to the wrapping of a contoured article, and, in particular, a vehicle body or part thereof.

It is known to wrap an article, for example a vehicle body, with a plastics film to alter the visual or aesthetic impact that the article provides or to protect the article from damage. In some instances wrapping includes providing a wrapping material which includes indicia, for example for advertising purposes.

Wrapping film is typically provided as a relatively wide plastics sheet, for example in a reel with a width of 1.3 m or 1.5 m. One such film is known as "Wrap Film 1080" available from 3M of St. Paul, Minn., USA. This film is a 90 μm cast vinyl film with a width of 1.5 m and is available in an array of colours and finishes (matte, satin, gloss etc.). Other films are available from other manufacturers.

In order to wrap a heavily contoured article, for example a vehicle body, it is necessary to ensure that the wrapping film is adhered to all of the surfaces of the article (e.g. the vehicle), with no air pockets remaining between the film and the article. As will be appreciated, the more heavily contoured the article, the more onerous is the task of ensuring that the film is adequately adhered to the surface thereof.

Because the film is provided as a flat sheet it is necessary to stretch the film to ensure that it conforms to the topography of the article. In areas of shallow contours this is achieved relatively easily. However, in areas of severe contours this is more difficult to achieve. In such areas, it is known to conduct a process known as 'post heating' whereby the film is heated to an elevated temperature to cause the film to lose any 'memory' of its previous flat shape and thereby conform to (and remain conformed to) the heavily contoured areas of the article once the heat source has been removed. In order to check if the film has been adequately post-heated, it is necessary to monitor the temperature of the film using an infra-red thermometer. A prior art method of securing a wrapping film to a vehicle, and including a post-heating step, is shown in FIG. 1. The actual post-heating process requires a hot air gun or other heat source to be used in one hand and to be moved back-and-forth over the area of concern. Intermittently the heat source is removed and the temperature checked using the infra-red thermometer, taking care to ensure that the thermometer is measuring the temperature of the film rather than the temperature of the air being expelled from the hot air gun.

If a heavily contoured area is not adequately post-heated the film in the region can 'pop out' or 'lift' from the surface of the article to seek to adopt its previous flat configuration. Such lifting does not always happen immediately and may occur after a delay, sometimes a day or more once the adhesion between the film and the underlying vehicle body has been overcome. Clearly, such a situation is deleterious.

Accordingly, it is an object of this invention to mitigate the problems of the prior art.

A first aspect of the invention provides a method of wrapping an article, the method comprises applying a wrapping film to an article and locating a thermochromics material in, adjacent or proximate an area requiring post-heating, heating the wrapping film to effect a post-heating operation until the thermochromics material changes colour.

Advantageously, the thermochromics material provides a quick and effective measure of where heat has been applied sufficiently to effect a robust and appropriate post-heating operation.

The thermochromics material may remain on the article until the article has been delivered or accepted by the owner.

A second aspect of the invention provides a kit of parts, the kit comprising wrapping material to wrap an article and thermochromics material for use with the wrapping material during a post-heating operation.

The thermochromics material may undergo an irreversible colour change once heated to a suitable (e.g. post heating) temperature.

The thermochromics material may undergo a colour change when it is heated at or towards an elevated temperature, where the elevated temperature is higher than a suitable temperature or is a temperature suitable for post-heating. In such a way the thermochromics material is able to prevent over-heating of the wrapping material which might otherwise be burnt or become damaged through application of too much heat.

The thermochromics material may undergo a colour change at temperatures between 60 to 120 or 150° C., say between 75 or 80 to 110 or 120° C., or say between 80 to 100° C., say 85 to 95° C., e.g. 90° C.

The thermochromics material may be provided as a liquid or paste, for example as a paint, for application to the article by brush, spray or other application method or as a solid, for example as a tape. In one embodiment the tape may be provided with an adhesive to removably secure the thermochromics material to the article. Alternatively, the tape may be configured to be removably secured to the article by virtue of a static charge, for example as is provided by decorative 'static cling' type films.

In embodiments, the thermochromics material may undergo a reversible or irreversible colour change. For example, the thermochromics material may comprise thermochromic liquid crystals (LCs), a metal compound or complex, an organic compound or. The thermochromics material may comprise an ink, or a dye, for example a leuco dye and a developer.

Plural thermochromics materials may be provided, a first undergoing a colour change at a first 'desired' temperature and a second undergoing a colour change at a second, higher, temperature.

Preferably the article is a vehicle.

A yet further aspect of the invention provides a vehicle, the vehicle having a body panel which has been wrapped by a wrapping film and having a thermochromics material applied to the wrapping film, adjacent or proximate a contoured area of the body panel.

In order that the invention may be more fully understood, it will now be described, by way of example only and with reference to the accompanying drawings, in which.

Figure 1:
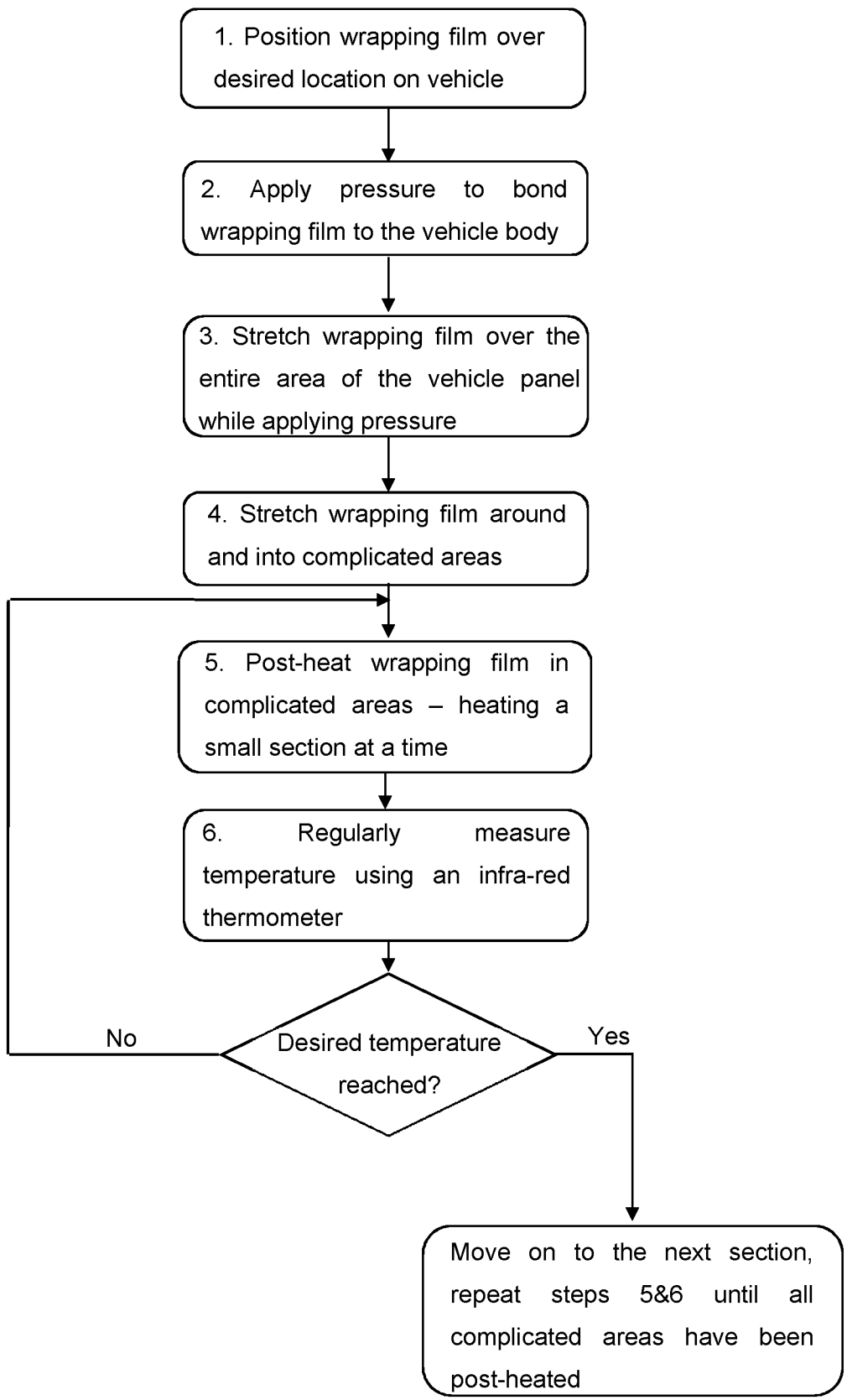
FIG. 1 is a flow diagram of a prior at method of wrapping a vehicle.

Referring first to FIG. 1, there is shown a flow diagram of a prior art method of wrapping a vehicle, wherein the wrapping material is applied to the desired location of the vehicle, for example over one or more body panels and pressure is applied to adhere the wrapping film to the body panel. In step 3 it may be the case that a low level of heat (e.g. to heat the film to 40-50° C.) is applied to ensure that the film is correctly applied into low contoured areas. In areas of severe contour the film is stretched to conform to the underlying body panel and subsequently heated to cause the film to lose any 'memory' it may have had and thereby ensure that it remains adhered to the underlying panel.

Post-heating is typically undertaken using a hot air gun and an infrared thermometer, whereby heat is applied from the gun and periodically the temperature of the film is checked using the thermometer. Clearly, it is not possible to determine accurately if all of the target areas have been heated, or at least heated to a sufficient degree. The ramifications of this are that some areas may be insufficiently heated (or missed entirely) and thus may 'lift' once the temperature has been reduced, or extra and unnecessary time may be taken by the operative to ensure that all of the target areas have been heated, or the film may become damaged by over-heating.

Figure 2:
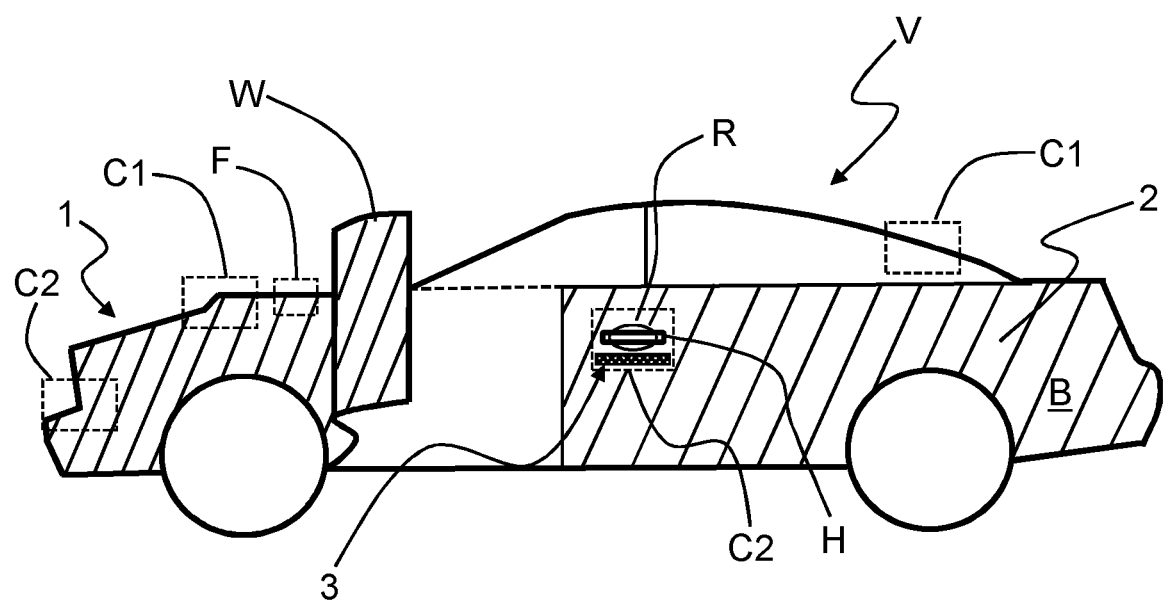
FIG. 2 is a side elevation of a vehicle being wrapped according to the invention.

Referring now to FIG. 2, there is shown a vehicle V having a body B to which a wrapping material W is being applied.

As is known, wrapping material W is typically applied as a wrapping film 1 (or simply film 1) which is usually formed from a relatively thin plastics substrate having a contact adhesive located on a major surface thereof whereby the film 1 can be secured to a body panel 2 of the vehicle V.

The film 1 will usually carry colours, textures indicia or other marking material to provide a decorative or desired finish, or may be formed as a clear film so as to provide a protective layer for the underlying body panel 2, for example to provide a protective overcoat to mitigate against paint chips.

Clearly most vehicles V are provided with contours along or across one, some or all of the body panels 2 thereof. As the film 1 is provided as a flat sheet it is necessary to ensure that the film 1 conforms to the multifarious contours of the vehicle V.

As stated above, in order to ensure compliance of the film 1 to contoured areas of the body B it is necessary to undertake post-heating, whereby the film is heated to an elevated temperature and forced into the contour. Post-heating ensures that the 'memory' of the film 1 is lost and that the film can be adhered to the adjacent or underlying body panel. We believe, although we neither wish nor intend to be bound by any particular theory, that post-heating is intended to elevate the film to a temperature in excess of its glass transition temperature ($T_g$).

Referring again to FIG. 2, there is indicated by boxes areas of shallow contours, e.g. C1 and areas of deep or severe contours, e.g. C2. It is in areas of contour, and most preferably although not exclusively, in areas of deep or severe contour C2, where the current invention is of particular use.

For example, and as shown in FIG. 2, the recess R around the door handle H is a severely contoured region C2 which requires the film 1 to be stretched so as to conform to the shape of the recess R, whereas other areas F may be flat or substantially flat and the film 1 may conform naturally, or at least with minimal forcing, to the underlying body panel 2.

In accordance with the invention a thermochromics material 3 is applied to, adjacent or proximate the recess R (or other contoured areas) such that when the film 1 is exposed to heat and pressure in a post heating operation so too is the thermochromics material 3. As the film 1 is heated to a desired temperature so the thermochromics material 3 is heated to a temperature at which the thermochromics material 3 undergoes a visible colour change.

Figure 3:
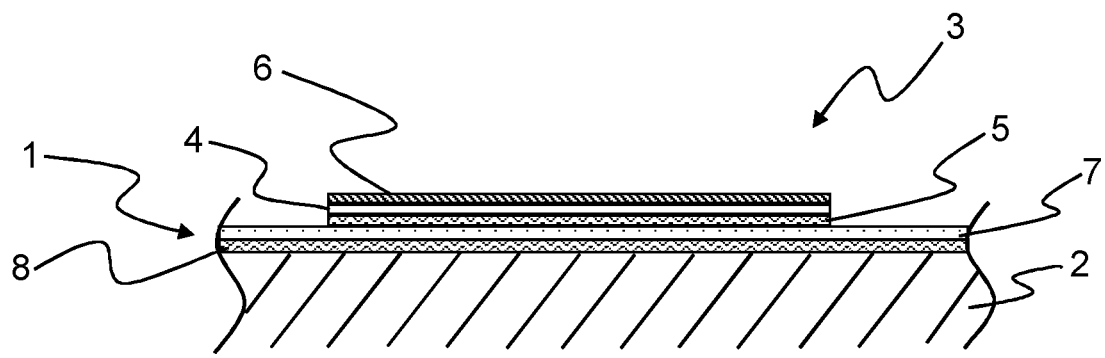
FIG. 3 is a section through a portion of a vehicle.

Referring now to FIG. 3, there is shown a thermochromics material 3 applied to a wrapping material 1 which is applied to a body panel 2 of a vehicle V.

The thermochromics material 3 includes, in this embodiment, a thermo-chromic tape comprising a thermochromics layer 6, a substrate layer 4 and an adhesive layer 5, the adhesive layer 5 being disposed on one side of the substrate layer 4 with the thermochromics layer 6 being disposed on the other side of the substrate layer 4. All of the layers are thin and flexible so as to allow the thermochromics material 3 to conform to the underlying body panel 2 and especially any heavily contoured areas C2 for providing a visual indication of the temperature of the underlying and/or surrounding wrapping film 1 during a post heating process.

Figure 4:
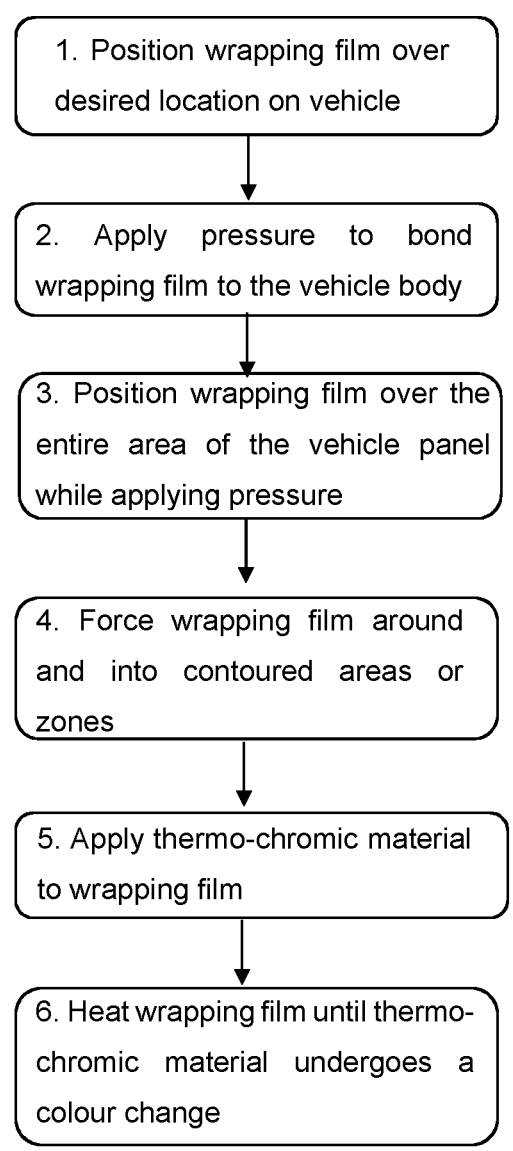
FIG. 4 is a flow diagram of the method according to the invention.
Figure 4:
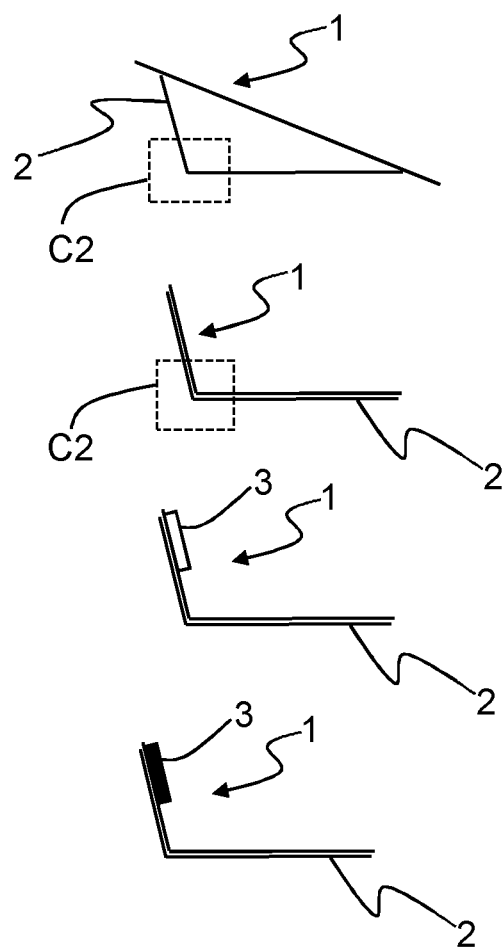

Referring to FIG. 4, an illustrative method of wrapping a body B (or a part thereof) of a vehicle V using a wrapping film 1 is as follows:
1. Positioning the wrapping film 1 over a desired part of a body B of a vehicle V, for example over all or some of a body panel 2;
2. Adhering the wrapping film 1 to the underlying body panel 2 in the flatter areas F by applying pressure;
3. Stretching the wrapping film 1 such that it covers the entire area of the vehicle body 2 while applying pressure, and especially over contoured areas, for example shallow contour areas C1;
4. Stretch the wrapping film 1 around and into areas of severe contours C2;
5. Locating thermochromics material 3 on or proximate the wrapping film 1 in, adjacent or proximate areas of severe contours C2 prior to a post heating operation.
6. Post-heating the area of wrapping film 1 beneath and/or around the thermochromics material 3 until the colour changes.

FIG. 4 provides the steps of a method according to the invention and illustrates the wrapping material 1 being stretched and forced to conform to a severe contour C2 of a body panel 2 and is typical of a situation where post-heating would be required. In the following step, a thermochromics material 3 is applied proximate to the severe contour C2 to indicate when sufficient heating has been applied to the film 1.

In use, a wrapping film 1 is unspooled from a reel and may be cut or trimmed to the desired size (although trimming usually occurs once the film has been applied) and then positioned over a vehicle body panel 2 or a panel intended for or belonging to a vehicle body 2 or part thereof. Once the wrapping film 1 is in the desired position pressure is then applied to the wrapping film 1 thereby providing a bond between the wrapping film 1 and the vehicle body panel 2. Preferably, the wrapping film 1 is then heated, using for example a heat gun (not shown), to allow stretching of the wrapping film 1 thereby allowing it to substantially conform to the contours of the vehicle body 2 while remaining taut. Alternatively, the wrapping film 1 may be stretched to conform to the contours of the vehicle body 2 without pre-heating.

Once the wrapping film 1 has substantially conformed and a bond has been formed between the wrapping film 1 and vehicle body 2 the thermochromics material 3 is applied to the wrapping film 1 in or to, adjacent or proximate the regions of the vehicle body panel 2 where there are contours (C1, C2) and most preferably severe contours C2 e.g. door mirrors, door handle recesses, bumper and bonnet air vents etc.

In any areas where the film 'bridges' a contour C1, C2 in a panel 2 heat is applied to help stretch the film 1 and to help the adhesive 5 to flow with the film 1. At this stage any air trapped between the film 1 and the underlying body panel 2 can be worked to the periphery of the film 1 and thence expelled. Post heating may then be conducted, whereby heat is applied until the film 1 (and preferably the underlying body panel) reaches from, say 80 or 90° C. to 120° C. The heat is applied such that the film 1 at least reaches its glass transition temperature, thereby allowing movement of the molecules within the material of the wrapping film 1 and, while applying force to stretch it around the contours C1, C2, allowing it to conform to the contours C1, C2 of the vehicle body panels 2 without wanting to return to its original shape. The presence of the thermochromics material 3 provides a visual indication of the temperature of the underlying, adjacent and/or surrounding film 1 such that the correct level of heating can be applied. The thermochromics material 3 is configured to change colour with a change in temperature, hence it can be established when a pre-determined temperature has been reached based on the arrival at a given colour of the thermochromics material 3. Once the thermochromics material 3 has undergone a colour change it is possible to remove the heat source and allow the film 1 to cool.

As the film 1 cools (for example to 30 to 40° C.) a roller or other device may be used to apply pressure to the film 1 in the region of the contour C1, C2, thereby to increase the intimacy of the bond between film 1 and panel 2.

If too little heat is applied (and, for example, the wrapping film 1 does not reach its glass transition temperature) then the film 1 will not conform and be adequately secured to the contours C1, C2, and especially the or any severe contours C2 and will try to return to a flat shape. If too much heat is applied then damage to the film 1 may occur as it may start either to burn or decompose.

Preferably, upon exposure to a suitable level of heat, the thermochromics material 3 undergoes an irreversible temperature change to provide a permanent visual indicator that a sufficient amount of heat has been applied to the film 1. Once the post-heating process is complete the thermochromics material 3 may be retained on the film 1 to allow inspection by other employees or the customer and to provide an indication that the post-heating process has been carried out correctly. Alternatively, the thermochromics material 3 may be removed from the wrapping film 1 either before or after inspection.

The wrapping film 1 is any suitable wrapping film used in the art e.g. a polymeric sheet 7 carrying a layer of pressure sensitive adhesive 8.

The thermochromics material 3 in this embodiment is a thermo-chromic tape. The thermo-chromic properties are imparted by the thermochromics layer 6, which most preferably undergoes an irreversible thermochromics reaction. Suitable materials comprise thermochromics inks but any other suitable thermochromics substance may be used. The thermochromics ink may comprise thermo-chromic liquid crystals or thermo-chromic dyes. In other embodiments the thermochromics properties are provided by a reversible thermo-chromic ink, potentially allowing for re-use of the thermochromics material 3. The thermochromic ink forming the thermochromics layer 6 is located on, for example printed onto, the surface of a film substrate layer 4, for example using a flat screen printing process although any other effective method of application may be used.

The thermochromics material 3 need not be in the form of a tape but may be of any other suitable form e.g. labels, stickers or a sheet whereby the necessary sized section is cut by the user.

The substrate layer 4 provides a suitable surface for adhesion of the thermo-chromic ink or any other thermochromic material 6. In this embodiment the film substrate layer 4 has an adhesive layer 5 disposed on one of its sides. The film substrate layer 4 has a melting temperature or temperature at which decomposition occurs above the glass transition temperature of the wrapping film 1.

As stated above, the thermochromics material 3 may be absent an adhesive, and may be presented, for example, with a static cling substrate, allowing it to be applied to the surface of the wrapping film 1 without the need for an adhesive layer 5. Alternatively, the thermochromics material 3 may have no substrate and be in the form of a paste or liquid, thereby being applied by for example a brush or any other suitable means, the thermochromics material 3 providing an indication of the temperature of the surrounding wrapping film 1 before either being wiped, washed or dissolved away from the surface. In another embodiment the thermochromics material 3 does not require adhesive properties and may be held adjacent to the surface of the wrapping film 1 during pre-heating such that it provides an indication of the temperature of the underlying and/or surrounding wrapping film 1, being removed and disposed of after the desired temperature has been reached or being moved to the next location easily and quickly without the need to adhere it to the wrapping film 1. In a further embodiment, the thermochromics material 3 may simply be held in proximity to the area to be post-heated without securing it to the wrapping film 1. For example a tape or card or other substrate provided with a thermochromics material 3 may be held is proximity to the area to be post-heated, for example held by hand, and, once post-heating has been completed, the substrate moved to a further location.

In some embodiments, the thermochromics material 3 may have plural further layers, for example a varnish or clear coat layer may be provided atop the thermochromics layer 6. If present, the adhesive layer 5 may be provided with a release liner to protect the adhesive layer 5 before it is applied to the wrapping film 1. Moreover, the thermochromics material 3 may have or may comprise more than one thermochromic indicating materials, the first to indicate that a suitable temperature for post heating has occurred and the second to indicate that an elevated temperature has been reached, wherein the elevated temperature is higher than the suitable temperature. The elevated temperature may be at or around a temperature at which damage to the underlying film 1 may occur, thereby providing a visual indication that damage may occur if heating in a particular area is continued.

The adhesive layer 5 may be any suitable pressure sensitive adhesive e.g. acrylics, to allow the thermochromics material 3 to be removed when required. In other embodiments, the adhesive layer 5 is in the form of a re-usable adhesive, allowing the thermochromics material 3 to be removed from the wrapping film 1 after use and re-used, saving cost.

In operation, the thermochromics material 3 provides a clear visual indication that sufficient heat has been applied to effect an appropriate post-heat treatment of a wrapping film 1. This enables an operative installing the wrapping film 1 to quickly a definitively ascertain where post heating has occurred and where further post-heating needs to occur. Also, if the thermochromics material 3 is left on the article it provides a clear visual indicator to a person inspecting the vehicle (for example a manager, vehicle owner or some such) that the post heating operation has been carried out thoroughly and rigorously. Moreover, the thermochromics material 3 can be configured to provide a visual indication of where damage may have occurred through over-heating a particular area of a wrapping film 1.

It will also be appreciated by those skilled in the art that any number of combinations of the aforementioned features and/or those shown in the appended drawings provide clear advantages over the prior art and are therefore within the scope of the invention described herein.

The invention claimed is:

1. A method of wrapping a vehicle, the method comprises applying a wrapping film to a vehicle and locating a thermochromics material in, adjacent or proximate an area requiring post-heating by removably securing it to the wrapping film, wherein the thermochromics material comprises a first and second thermochromic indicating material, the first thermochromic indicating material is configured to indicate that a suitable post heating temperature has occurred and the second thermochromic indicating material is configured to indicate that an elevated temperature has been reached, the elevated temperature being greater than the suitable post heating temperature, heating the wrapping film to effect a post-heating operation until the first thermochromic indicating material changes colour and subsequently removing the thermochromics material.

2. A method according to claim 1, comprising heating the wrapping film until the thermochromics material undergoes an irreversible colour change.

3. A method according to claim 1, comprising locating the thermochromics material by adhering it to the wrapping film.

4. A method according to claim 1, comprising locating the thermochromics material in, adjacent or proximate a contoured region of the vehicle.

5. A method according to claim 1, comprising removing the thermochromics material once the vehicle has been inspected.

* * * * *